US007366878B1

(12) United States Patent
Mills et al.

(10) Patent No.: US 7,366,878 B1
(45) Date of Patent: Apr. 29, 2008

(54) SCHEDULING INSTRUCTIONS FROM MULTI-THREAD INSTRUCTION BUFFER BASED ON PHASE BOUNDARY QUALIFYING RULE FOR PHASES OF MATH AND DATA ACCESS OPERATIONS WITH BETTER CACHING

(75) Inventors: Peter C. Mills, San Jose, CA (US); John Erik Lindholm, Saratoga, CA (US); Brett W. Coon, San Jose, CA (US); Gary M. Tarolli, Concord, MA (US); John Matthew Burgess, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 84 days.

(21) Appl. No.: 11/404,196

(22) Filed: Apr. 13, 2006

Related U.S. Application Data (63) Continuation-in-part of application No. 10/991,640, filed on Nov. 17, 2004.

(51) Int. Cl.
*G06F 9/50* (2006.01)
(52) U.S. Cl. ...................... 712/214; 718/103
(58) Field of Classification Search ............... None
See application file for complete search history.

(56) References Cited

U.S. PATENT DOCUMENTS 6,470,443 B1 * 10/2002 Emer et al. ................. 712/205
6,477,562 B2 * 11/2002 Nemirovsky et al. ....... 718/108
6,567,839 B1 * 5/2003 Borkenhagen et al. ...... 718/103
7,015,913 B1 * 3/2006 Lindholm et al. .......... 345/501
7,096,470 B2 * 8/2006 Brown et al. ............... 718/102
2005/0138328 A1 * 6/2005 Moy et al. .................. 712/205
2006/0136919 A1 * 6/2006 Aingaran et al. ........... 718/100

* cited by examiner

*Primary Examiner*—Kenneth S. Kim
(74) *Attorney, Agent, or Firm*—Patterson & Sheridan, LLP (57) ABSTRACT

A processor buffers asynchronous threads. Current instructions requiring operations provided by a plurality of execution units are divided into phases, each phase having at least one math operation and at least one texture cache access operation. Instructions within each phase are qualified and prioritized, with texture cache access operations in a subsequent phase not qualified until all of the texture cache access operations in a current phase have completed. The instructions may be qualified based on the status of the execution unit needed to execute one or more of the instructions. The instructions may also be qualified based on an age of each instruction, a divergence potential, locality, thread diversity, and resource requirements. Qualified instructions may be prioritized based on execution units needed to execute current instructions and the execution units in use. One or more of the prioritized instructions is issued per cycle to the plurality of execution units.

20 Claims, 8 Drawing Sheets

SCHEDULING INSTRUCTIONS FROM MULTI-THREAD INSTRUCTION BUFFER BASED ON PHASE BOUNDARY QUALIFYING RULE FOR PHASES OF MATH AND DATA ACCESS OPERATIONS WITH BETTER CACHING

CROSS-REFERENCE TO RELATED APPLICATIONS

This application is a continuation-in-part of co-pending U.S. patent application titled, "MULTI-THREADED PROCESSOR APPARATUS AND METHOD," filed Nov. 17, 2004, and having Ser. No. 10/991,640. The subject matter of the non-provisional patent application is hereby incorporated by reference.

BACKGROUND OF THE INVENTION

1. Field of the Invention

The present invention is generally related to multi-threaded processors. More particular, the present invention is directed towards multi-threaded processors having dedicated execution units for executing thread instructions.

2. Description of the Related Art

Multi-threaded processors are of increasing interest in a variety of applications. A multi-threaded processor has multiple threads for processing information. For example, multi-threaded processors are of interest for use in Graphics Processing Units (GPUs).

A GPU commonly includes stages dedicated to performing specified functions. An emerging problem is designing a multi-threaded GPU architecture that efficiently utilizes GPU resources, such as execution pipelines.

Therefore, what is desired is an improved multi-threaded processor architecture, and a new method and apparatus for qualifying and prioritizing instructions for execution by the threads.

SUMMARY OF THE INVENTION

A multithreaded processor buffers current instructions of threads and prioritizes the issue of current instructions to execution units. One embodiment of a processor includes a plurality of different types of execution units, each type of execution unit servicing a different class of operations. In one embodiment there is one or more of each type of execution unit. An instruction buffer buffers a set of current instructions for a plurality of asynchronous threads, each current instruction requiring an operation performed by one of the plurality of different types of execution units. An instruction scheduler qualifies at least a portion of the current instructions for execution and prioritizes the qualified instructions. The instruction scheduler issues on each issue cycle one or more of the prioritized instructions from the instruction buffer to the plurality of different types of execution units.

Various embodiments of the current invention provide a multi-threaded processor generally including a plurality of different types of execution units, an instruction buffer, and an instruction scheduler that includes a qualification module and a prioritization module. At least one of each type of execution unit is configured to service a different class of operations. The instruction buffer is configured to buffer a set of current instructions for a plurality of asynchronous threads, each current instruction requiring an operation performed by one of each of said plurality of different types of execution units. The qualification module is configured to qualify at least a portion of said set of current instructions for execution based on a qualification rule to produce a set of qualified instructions. The prioritization module is configured to prioritize said set of qualified instructions based on a prioritization rule to produce prioritized instructions for issue from said instruction buffer to said plurality of different types of execution units Various embodiments of a method of the invention for operating a multi-threaded processor include buffering current instructions for asynchronous threads, a current instruction of an individual thread requiring one of a plurality of different types of execution units to service a class of operations, qualifying buffered current instructions to produce a set of qualified instructions, prioritizing said qualified instructions to produce prioritized instructions based on rules to improve utilization of said different types of execution units, and for each issue cycle, issuing at least a portion of said prioritized instructions to said plurality of execution units for execution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
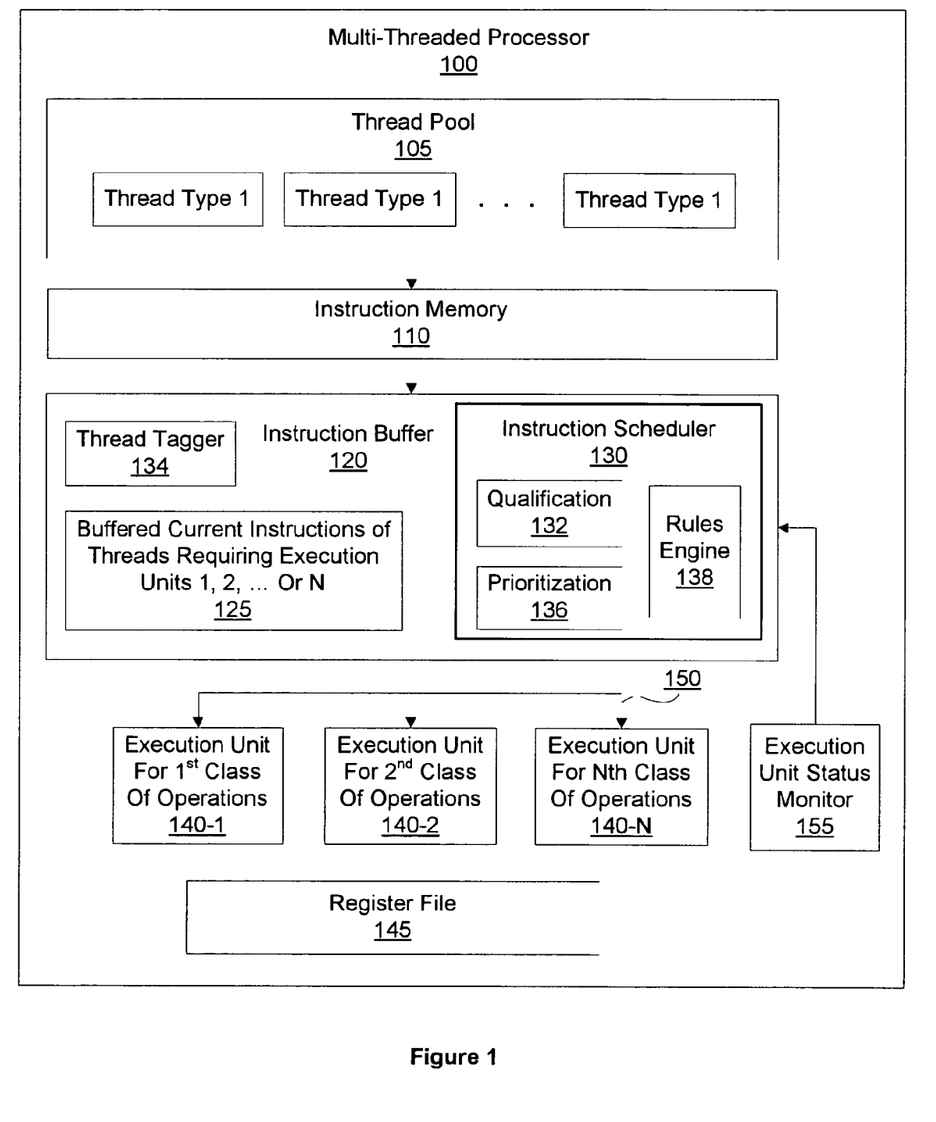
FIG. 1 is a block diagram of a multi-threaded processor in accordance with one embodiment of the present invention.

FIG. 1 is a block diagram illustrating a multi-threaded processor 100 in accordance with one embodiment of the present invention. Multi-threaded processor 100 includes a thread pool 105. In one embodiment, the threads in thread pool 105 run asynchronously, i.e., they are not synchronized with each other. Consequentially, at any one particular time, individual threads in the thread pool of threads 105 may require different operations.

In one embodiment, thread pool 105 includes different thread types for processing different types of information. The threads may include an integer number of different thread types, such as thread type 1, thread type 2, . . . thread type K, where there are a plurality of threads of each type within thread pool 105. A particular thread type may, for example, be a computing thread type or a graphics thread type. For example, in a Graphics Processing Unit (GPU) implementation, thread pool 105 may include vertex threads for processing vertex information and pixel threads for processing pixel information. In some implementations, different types of threads may request different types of operations. However, more generally, different types of threads may request at least one operation that is identical. For example, in some embodiments both pixel threads and vertex threads may request the same type of mathematical operation to be performed.

An instruction memory 110 fetches a current instruction for each thread based on the program counter of the thread. Instruction memory 110 may, for example, have a multi-level structure with one or more local caches (not shown) to improve efficiency.

An instruction buffer 120 associated with instruction memory 110 buffers a set of current instructions 125 for a set of threads. At any one particular time, instruction buffer 120 will have a certain number of current instructions 125 in instruction buffer 120. The number at a particular point in time depends, for example on a fetch policy used to select a new set of instructions to enter instruction buffer 120 and the issue policy used to issue instructions out of instruction buffer 120 during instruction cycles.

In one embodiment a thread tagger 134 includes logic for tagging instructions that are fetched into instruction buffer 120. The fetched instructions are tagged to indicate the type of execution unit 140 required to execute the instruction.

Each current instruction in buffer 120 has one or more attributes, such as a thread type attribute and an instruction age attribute. The thread type attribute describes the thread type associated with the instruction. The instruction age attribute may, for example, be a thread attribute related to age, such as a launch order or the age of the instruction within instruction buffer 120.

Each of the instructions in instruction buffer 120 utilizes the resources of an execution unit 140 to perform an operation required by the corresponding thread. In one embodiment, each execution unit 140-1 . . . 140-N is implemented in hardware as a unit that is configured to perform a class of operations for the threads. The class of operations may include a single operation but more generally may comprise a number of different operations that execution unit 140 can perform. While each execution unit 140 may service a different class of operations, in one embodiment there is more than one execution unit 140 to service at least one class of operations.

Each execution unit 140 has an input for receiving a current instruction (not shown) and an associated latency for performing an operation for a thread, e.g., an operation will take a number of cycles to complete. In one embodiment, there is a positive integer number, N, of different types of execution units 140, such as execution units 140-1, 140-2, . . . 140-N and each type of execution unit 140 is adapted to service a different class of operations for the current instructions of the threads. For example, in the context of a graphics processing unit (GPU) implementation, execution unit 140-1 may be dedicated to servicing instructions for texture operations, execution unit 140-2 may be dedicated to servicing instructions for multiply-add (MAD) operations (e.g., blending operations), and execution unit 140-N may be dedicated to servicing instructions for specialized mathematical operations, such as the reciprocal, logarithmic, exponential, or other mathematical function. In one embodiment each execution unit 140 is an execution pipeline, such as a programmable pipeline having a plurality of stages.

The execution units 140 each have operational attributes. For example, an individual execution unit 140 may be non-stallable or may be capable of stalling. At a particular point in time an individual execution unit 140 may be in a normal or a stalled state. In an execution pipeline embodiment, the instructions are processed in stages, such that a new instruction can enter a first stage of the execution pipeline once a previous instruction has passed on to a subsequent stage.

An instruction scheduler 130 includes a qualification module 132 for qualifying valid instructions for issue to each execution unit 140. Additionally instruction scheduler 130 includes a prioritization module 136 for prioritizing the issue order of instructions. As described below in more detail, qualification module 132 and prioritization module 136 permit an optimization of the selection of instructions for issuance to the execution units 140 that improves execution unit utilization.

Instruction scheduler 130 selects a set of instructions per issue cycle to be issued to the execution units 140 via a bus 150. In one embodiment, the maximum number of instructions that may be issued per cycle is an integer number M, where M≦N. For example, in a processor with a total of three different execution units 140-1, 140-2, and 140-N, the number of instructions issued per cycle may be 0, 1, 2, or 3. The maximum number, M, may be limited due to the limitations of bus 150 or other constraints. Thus, in some implementations M<N, such that only a subset of the execution units 140 can receive an instruction in a particular cycle. However, it will be understood that in an alternate embodiment that threads are grouped into convoys such that M>N. As an illustrative example, threads could be grouped into a group of ten and one group of ten instructions issued into each execution unit 140 every 10th cycle.

Additionally, it will be understood that the instruction buffer 120 may also issue instructions to individual execution units 140 as a group. In one embodiment, threads are grouped into pairs that share the same instruction. The single instruction that the pair of threads shares is sent across bus 150. The execution unit that receives the instruction then repeats the instruction twice, once for each thread. This implementation has the benefit that the bus width does not have to be modified, i.e., a single-width bus may be utilized. However, it will be understood that in an alternate embodiment, bus 150 is a double-width bus adapted for instruction buffer 120 to fetch a pair of instructions for an execution unit 140 in each issue cycle, i.e., a pair of instructions is fetched once, then executed twice in succession by the execution unit. In this embodiment, there is a maximum number of pairs of instructions that may be issued, where M≦N/2.

A register file 145 is provided for threads to perform register reads and writes. In one embodiment, register file 145 includes a bank of independent registers.

In one embodiment a scoreboard (not shown) is also included for instruction scheduler 130 to track the status of instructions executing in each execution unit 140. In some embodiments, a monitor 155 is provided to monitor the status of execution units 140-1, 140-2, . . . 140-N for instruction buffer 120. Monitor 155 may, for example, detect stalls of individual execution units 140, collisions regarding writebacks of one or more execution units 140 to register file 145, or track the status of operations in execution units 140.

Instruction scheduler 130 prioritizes the buffered instructions 125 to determine a priority for issuing instructions. For each cycle, instruction scheduler 130 selects a number of buffered instructions 125 to be issued to execution units 140-1 . . . 140-N. The instruction scheduler 130 issues a maximum number, M, of instructions per issue cycle that is less than the buffer capacity of instruction buffer 120.

Instruction scheduler 130 can select an issue order that is more efficient than that which would occur if thread pool 105 directly accessed the execution units 140 without buffering and prioritization. This is because the asynchronous nature of the threads makes it likely that the current instructions of different threads request different operations. Consequently, it is likely that work can be found for all of the execution units 140 if a sufficient number of current instructions are buffered. Increasing the capacity of instruction buffer 120 increases the statistical likelihood that instruction scheduler 130 can perform an optimization of the instruction issue order. Also, increasing the capacity of instruction buffer 120 permits different types of optimizations. For example, increasing the capacity of instruction buffer 120 increases the likelihood that current instructions 125 include a distribution of thread type attributes, instruction age attributes, or other attributes, thereby increasing the choices that instruction scheduler 130 can make to optimize the issue order. For example, the instruction buffer 120 may be sized to make it statistically likely that when instruction buffer 120 is full then instruction scheduler 130 can find a pre-selected number of instructions (e.g., at least one) that can be issued to each of the execution units 140. In one embodiment, the instruction buffer is sized so that each thread has one guaranteed slot in the instruction buffer (e.g., if there are 24 threads there are at least 24 slots such that each thread has one guaranteed slot). It will be understood that one of ordinary skill in the art could perform modeling or empirical investigations to determine the buffer capacity required for a particular implementation of processor 100 to improve the utilization efficiency of execution units 140.

The prioritization can be carried out each time instruction buffer 120 is refreshed with new instructions from thread pool 105. However, since the status of execution units can change, in some embodiments the prioritization is updated to adapt to any changes in the execution environment. In one embodiment, a rules engine 138 within instruction scheduler 130 may apply one or more rules to achieve a variety of objectives, such as distributing work between execution units 140 to improve the utilization of the various execution units 140 (e.g., to keep each execution unit 140 filled with instructions), avoiding the development of too large a backlog of instructions for a particular execution unit 140, and avoiding unduly delaying the execution of the threads. The particular set of rules that is applied by rules engine 138 will depend upon the implementation of processor 100 and upon the combination of objectives that are desired. In one embodiment, rules engine 138 is programmable to permit a set of rules to be programmed.

One example of a rule that may be applied by instruction scheduler 130 is a qualification rule. In one embodiment, instruction scheduler 130 qualifies an instruction for issuance to a particular execution unit only if issuance of the instruction on a particular cycle would not generate a deleterious condition. Instructions that would generate a deleterious condition are disqualified. Disqualifying instructions permits a more efficient utilization of the execution units 140. For example, in one embodiment if a particular execution unit 140 is unavailable for at least one issue cycle (e.g., the execution unit is blocked, busy, or stalled such that is not immediately available to perform an operation), the instruction scheduler 130 disqualifies instructions requiring the unavailable execution unit from being issued in that cycle. This permits, for example, issuing instructions to execution units that are available for execution of instructions. In some embodiments, information from monitor 155 is used by instruction scheduler 130 to disqualify instructions that would generate a collision of threads during writeback.

Instruction scheduler 130 may also use priority rules to assign a priority to each of the qualified instructions in instruction buffer 120. One example of a priority rule is that some thread types may be assigned a higher priority than other thread types. As an illustrative example, in a GPU implementation an instruction for a vertex thread may be assigned a higher priority than an instruction for a pixel thread.

Another example of a priority rule is a rule for assigning an issue order based upon instruction age, such as assigning a higher priority to older instructions in instruction buffer 120. For example, in one embodiment older instructions for a particular thread type are assigned a higher priority than newer instructions. As previously described, the instruction age may be any attributed related to age, such as a launch order or other attribute.

Still another example of a priority rule is a round robin scheme in which buffered instructions are issued in a round robin order. As one example, the round robin may cycle around instructions for threads of a particular thread type. More generally, any round robin scheme for distributing work in a cycle may be utilized, such as a round robin order based on cycling around the execution units.

Still yet another example of a priority rule is a rule for assigning priority based upon instruction statistics. For example, in one embodiment, priority is based upon the number of instructions requiring access to each execution unit. In one embodiment, the priority of an instruction is increased as the number of other instructions requiring the same execution unit increases. As an illustrative example, if the number of instructions that require a particular execution unit 140 increases, preference may be given to issuing these instructions to reduce the backlog of such instructions.

As still yet another example of a priority rule, the priority rule may be a rule selected to increase utilization of the execution units 140 based upon program statistics regarding the likely sequence of thread types that will be fetched into instruction buffer 130. In particular, although the asynchronous threads are not synchronized, there may be statistical patterns to the number and order in which threads of different types are fetched. For example, the statistical patterns may include a burst behavior in which threads requiring a particular execution unit tend to occur in bursts. One or more rules may be based upon statistical patterns associated with a program to improve utilization of the execution units. For example, a particular program may, for example, have a statistical likelihood that closely spaced asynchronous threads will require the same execution unit. In one embodiment a spacing rule is applied that spaces out the execution of the threads to increase the statistical probability that a large percentage of the execution units have work.

Figure 2:
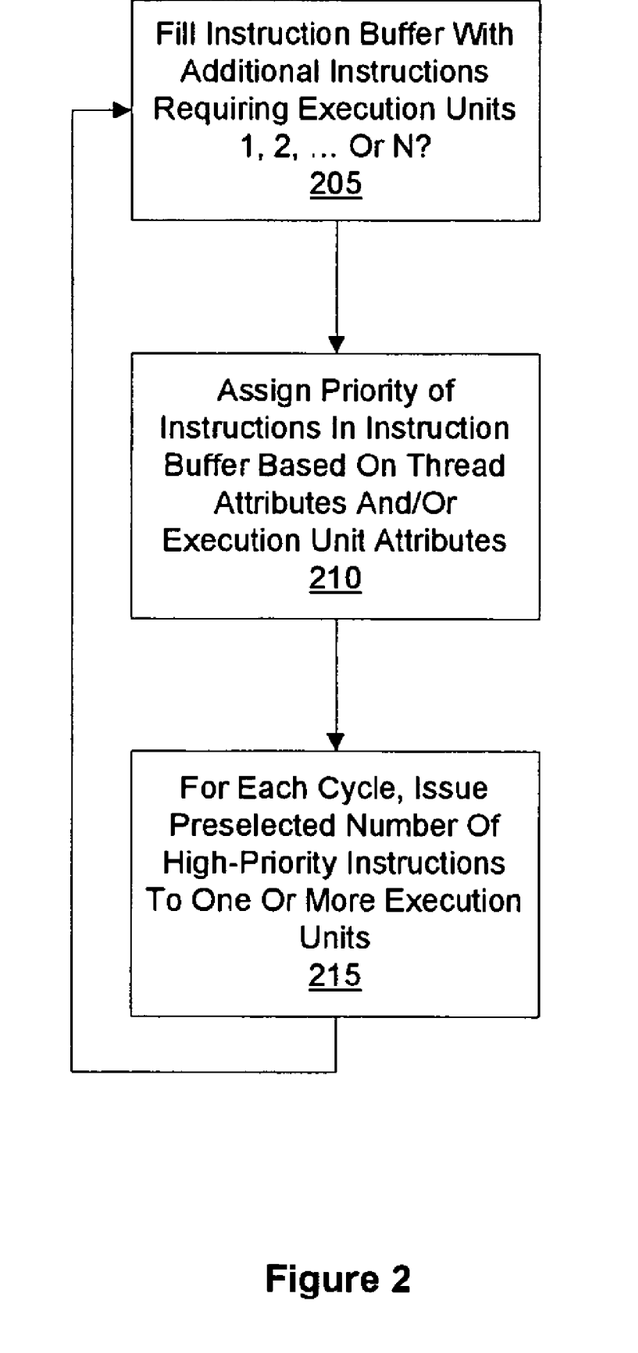
FIG. 2 is a flow chart of a method of issuing instructions to execution units in accordance with one embodiment of the present invention.

FIG. 2 is a flow chart of a method in accordance with one embodiment of the present invention. The instruction buffer is filled 205 with the instructions of threads requiring execution. In one embodiment, one or more rules are utilized by instruction buffer 120 for receiving new instructions. For example, if instruction buffer 120 has a fixed size, the rule may be based on the number of current instructions 125 in buffer 120. The priority of instructions in the buffer is assigned 210 based on thread attributes and execution unit attributes. For each cycle, a number of high-priority instructions are issued 215 to the execution units.

Figure 3:
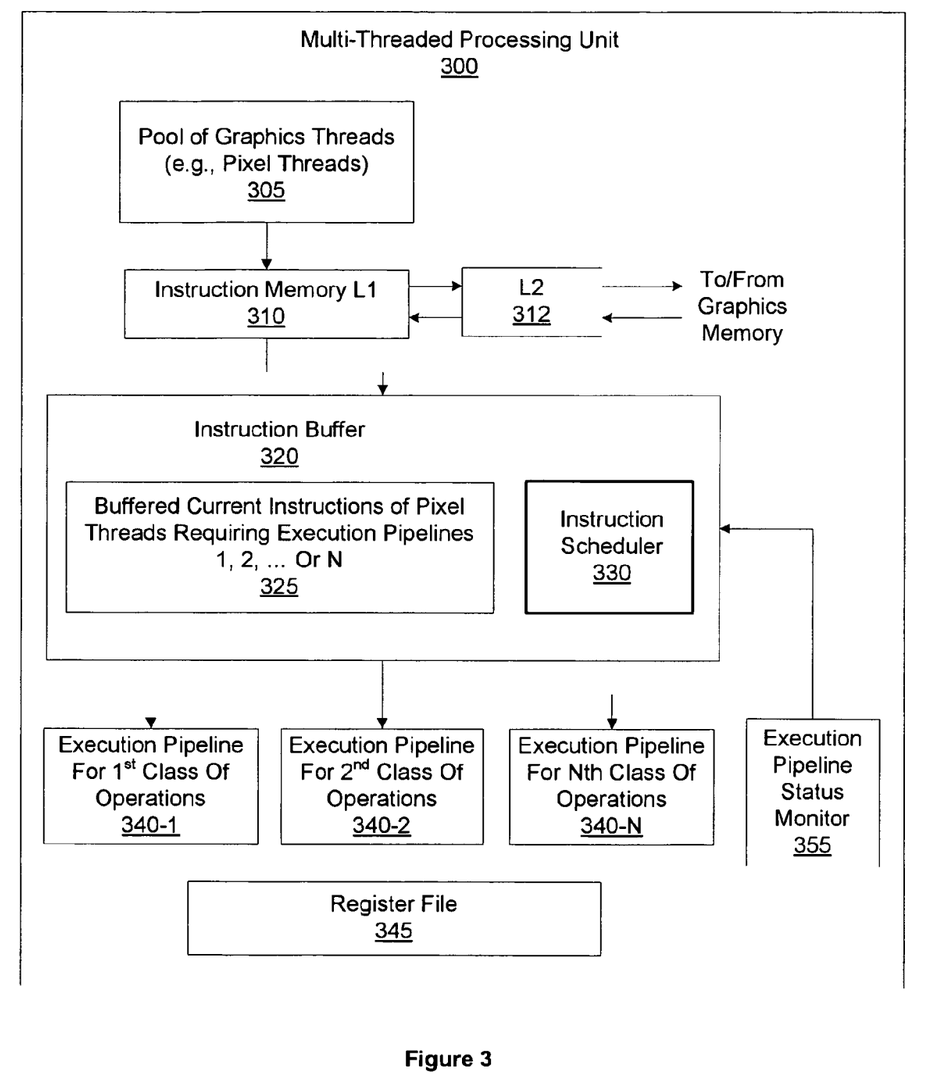
FIG. 3 is a block diagram of a multi-threaded graphics processing unit in accordance with one embodiment of the present invention.

FIG. 3 is a block diagram of an exemplary GPU implementation. Many of the elements perform similar functions as those described in regards to processor 100. In a multi-threaded GPU 300 there is a pool of graphics threads 305, such as pixel threads or vertex threads. Instruction memory 310 may comprise a level 1 (L1) cache coupled to a level 2 (L2) 312 cache. If there is a cache miss, a graphics memory (e.g., a frame buffer) may be accessed for an instruction. In this embodiment, an instruction buffer 320 buffers instructions of graphics threads 325 and includes an instruction scheduler 330. Execution pipelines 340 may comprise any execution pipeline used in a GPU for servicing graphics threads. A register file 345 is provided for register writes and a monitor 355 may be included in some embodiments for monitoring the status of execution pipelines 340.

As previously described, instruction scheduler 130 includes qualification module 132, prioritization module 136, and rules engine 138. Qualification module 132 qualifies valid instructions for issue to each execution unit 140 and prioritization module 136 prioritizes the qualified instructions into an issue order that may improve execution unit 140 utilization. Rules engine 138 may be programmed with qualification and/or prioritization rules that are applied by qualification module 132 and prioritization module 136, respectively. The rules may specify particular behavior based on the thread attributes and execution unit 140 operational attributes.

Figure 4A:
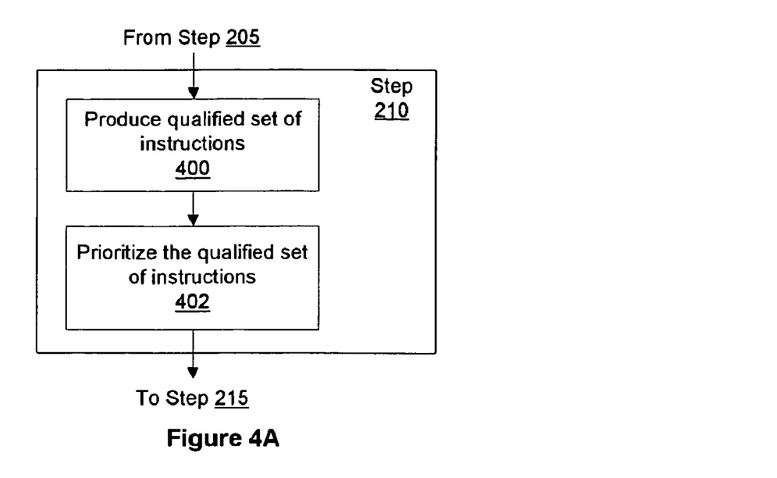
FIG. 4A is a flow chart of a method of performing step 210 of FIG. 2 in accordance with one embodiment of the present invention.

FIG. 4A is a flow chart of a method of performing step 210 of FIG. 2, in accordance with one embodiment of the present invention. In step 400 qualification module 132 produces a set of qualified instructions using one or more qualification rules, as described in conjunction with FIGS. 4B and 4C. In step 402 prioritization module 136 determines a prioritized order of the instructions in the set of qualified instructions using one or more prioritization rules. Prioritization module 136 produces a prioritized set of qualified instructions for issue to one or more execution units 140.

Figure 4B:
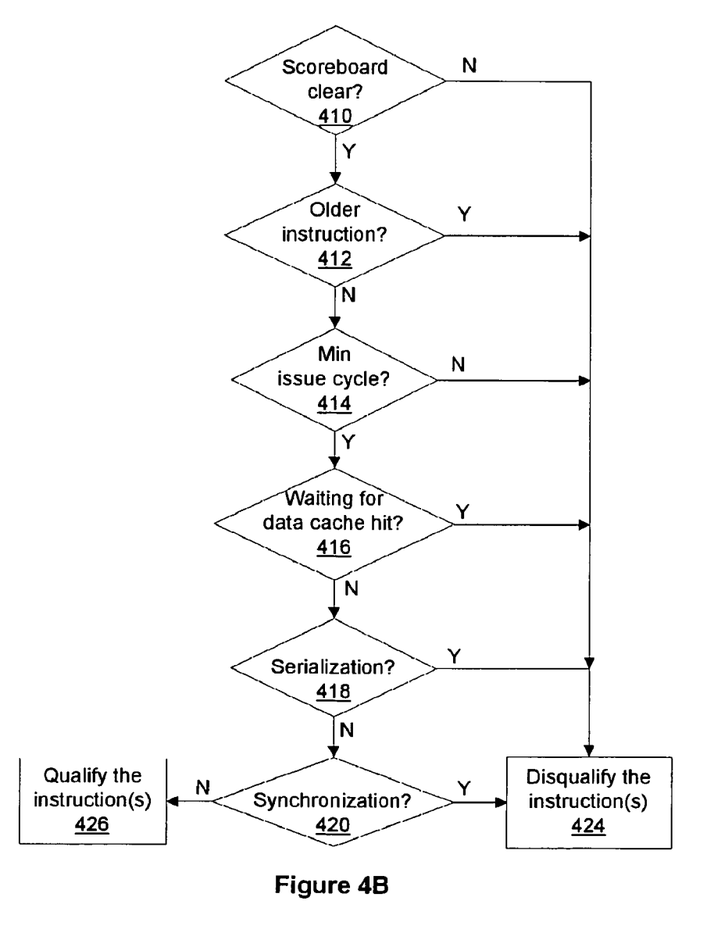
FIGS. 4B and 4C are flow charts of method of performing step 400 of FIG. 4A in accordance with one embodiment of the present invention.

FIG. 4B is a flow chart of method of performing step 400 of FIG. 4A, in accordance with one embodiment of the present invention. The steps shown in this flow chart are performed on each thread corresponding to the current instructions 125 in buffer 120. Qualification module 132 may receive one or more rules from rule engine 138 that are used in conjunction with thread attributes and/or execution unit 140 operational attributes to qualify or disqualify the current instruction for a thread based on data integrity requirements, resource limitations, and performance. Thread attributes may include scoreboard dependency bits, instruction age, issue cycle count, data cache hit status, serialization requirements, or the like. Operational attributes may include whether or not the execution unit may stall, storage resources, latency, the class of operations the execution unit may perform, and the like.

In step 410 qualification module 132 determines if the scoreboard dependency bits for the thread are clear, indicating that resources needed to perform the current instruction for the thread are available. Resources may include a local register file, output buffers, address registers, condition code registers, or the like. If, in step 410 qualification module 132 determines that the scoreboard dependency bits for the thread are not clear, qualification module 132 proceeds directly to step 424. Otherwise, in step 412 qualification module 132 determines if there is an older instruction for the thread in buffer 120, and, if so, qualification module 132 proceeds directly to step 424. Otherwise, in step 414 qualification module 132 determines if an issue cycle counter for the thread has reached a predetermined minimum value.

The issue cycle counter for a thread is reset whenever an instruction is issued for the thread and increments for every following issue cycle when an instruction is not issued for the thread. It may be used to control the frequency at which threads issue instructions. For example, in some embodiments of the present invention, instructions for the same thread may only issue once every 4 issue cycles. This feature may be used to accommodate latency of feedback signals. If, in step 414 qualification module 132 determines that the issue cycle count for the thread has not reached the predetermined minimum value, then qualification module 132 proceeds directly to step 424. Otherwise, qualification module 132 continues to step 416. In step 416 qualification module 132 determines if an in-flight instruction for the thread, i.e., instruction that has been issued but not completed execution, is waiting for a hit in the data cache, and, if so, qualification module 132 proceeds directly to step 424. Information regarding data cache hits may be provided to qualification module 132 by execution unit status monitor 155. This feature may be used to accommodate re-issuing the instruction that caused the data cache miss.

If, in step 416 qualification module 132 determines that an in-flight instruction for the thread is not waiting for a hit in the data cache, then in step 418 qualification module 132 determines if an in-flight instruction for the thread may require serialization, and, if so, qualification module 132 proceeds directly to step 424. Serialization may be needed due to operand divergence, in which case the instruction is reissued as many times as needed to serialize the data accesses. Otherwise, qualification module 132 proceeds to step 420 and determines if a synchronization state exists for the thread. A synchronization state may result from execution of a barrier instruction to synchronize two or more threads or to complete execution of an in-flight instruction for the thread. If, in step 420 qualification module 132 proceeds to step 420 and determines that a synchronization state exists for the thread, qualification module 132 proceeds to step 424. Otherwise, in step 426 qualification module 132 qualifies the current instruction(s) for the thread for execution and the instructions are included in the set of qualified instructions. In step 424 qualification module 132 disqualifies the current instruction(s) for the thread for execution and the instructions are not included in the set of qualified instructions. Disqualified instructions remain in buffer 120 until they are qualified and issued.

Figure 4C:
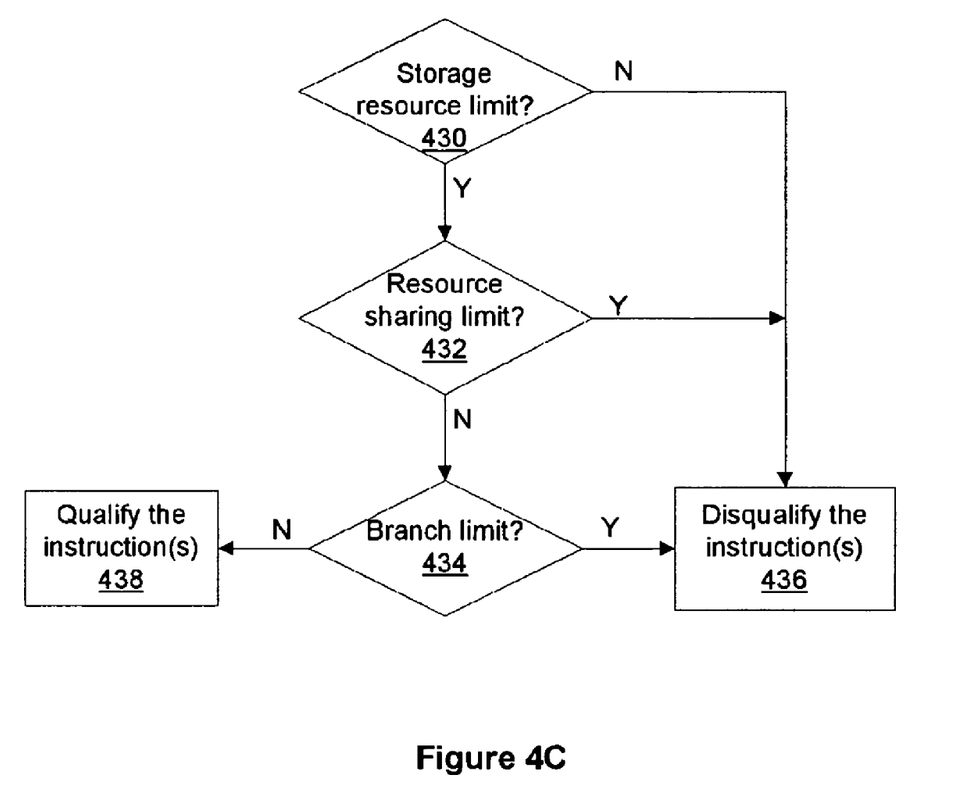

FIG. 4C is a flow chart of another method of performing step 400 of FIG. 4A, in accordance with one embodiment of the present invention. The steps shown in this flow chart are performed on all of the threads that correspond to the current instructions 125 in buffer 120. As previously described, qualification module 132 may receive one or more rules from rule engine 138 that are used in conjunction with thread attributes to qualify or disqualify the current instruction for the threads. The rules used in the steps shown in FIG. 4C may disqualify or qualify current instructions based on hardware limitations. One or more of the steps shown in FIG. 4B may be combined with one or more of the steps shown in FIG. 4C to perform step 400 of FIG. 4A.

In step 430 qualification module 132 determines if a storage resource limit exists for the threads, and, if so, then qualification module 132 proceeds directly to step 436. A storage resource limit may exist for particular operations, such as memory read or write requests or loading destination registers. If, in step 430 qualification module 132 determines that a storage resource limit does not exist, then in step 432 qualification module 132 determines if a resource sharing limit exists for the threads, and, if so, then qualification module 132 proceeds to step 436. A resource sharing limit may exist when an in-flight instruction needs a resource for multiple clock cycles. If, in step 432 qualification module 132 determines that a resource sharing limit does not exist for the threads, then in step 434 qualification module 132 determines if a branch limit exists for the threads. If, in step 434 qualification module 132 determines that a branch limit does not exist for the threads, then in step 438 qualification module 132 includes the current instructions for the threads in the set of qualified instructions. Otherwise, in step 436 qualification module 132 disqualifies the instructions. A branch limit may exist because branch instructions may not be issued in consecutive issue cycles.

In some embodiments of the present invention, an instruction may specify a preference for execution by a particular type of execution unit 140 when more than one type of execution can execute the instruction. A qualification rule may be used to configure qualification module 132 to ignore the specified preference when another execution unit 140 is available to execute the instruction. Another qualification rule may be used to configure qualification module 132 to qualify the instruction only if the specified execution unit 140 is available. In other embodiments of the present invention, additional steps may be included in the flow charts shown in FIGS. 4B and 4C to implement other qualification rules.

Figure 5A:
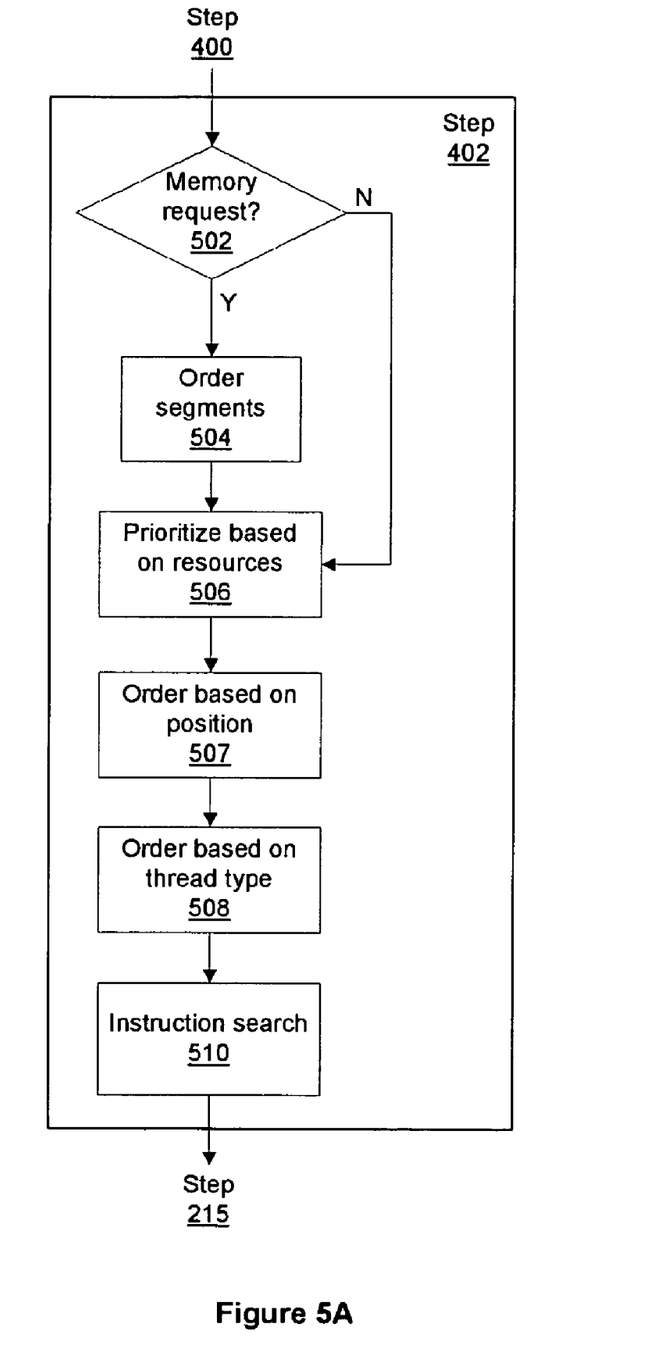
FIG. 5A is a flow chart of a method of performing step 402 of FIG. 4A in accordance with one embodiment of the present invention.

FIG. 5A is a flow chart of a method of performing step 402 of FIG. 4A in accordance with one embodiment of the present invention to produce a set of prioritized instructions. The steps shown in this flow chart are performed on the set of qualified threads to optimize the instruction issue order for efficient utilization of execution units 140. Prioritization module 136 may receive one or more rules from rule engine 138 that are used in conjunction with thread attributes and/or execution unit 140 operational attributes to prioritize the current instructions in the set of qualified instructions for improved performance. In addition to the previously described thread attributes, thread attributes may also include position (in screen space), memory request segments, instruction type counts, thread type, thread issue count, or the like.

In step 502 prioritization module 136 determines if there are any memory request instructions that are included in the current phase of a segmented program, and, if not, prioritization module 136 proceeds to step 506. A memory request instruction is an instruction that requires a read from or a write to memory during execution. For example, a texture fetch instruction requires a memory read. In order to improve cache coherency or efficient memory access, a program may be segmented, i.e., divided, into different phases to group memory request instructions and constrain cache and/or memory access. As an example, a large executable program with many threads running may be subdivided in an effort to make more efficient use of an instruction cache (I-cache) by enforcing a degree of locality and preventing different threads from evicting cache lines of instructions for other threads.

As another example, a shader program may be subdivided into phases of executable instructions for processing samples, each phase having one or more math operations and one or more texture cache access operations. The subdivision may be performed by a compiler that may surround each texture block including one or more texture memory accesses with several math operations, in an effort to ensure the shader is performing work while waiting for textures. These structures (block-texture, block-math) may be repeated throughout the executable code. The number of texture fetch operations in each texture block may, at least in part, be chosen to ensure the number of textures fetched by all operations in a block will fit in a texture cache to prevent the operations from fighting for cache space. For example, if the texture cache is sized to hold three textures, three texture fetch operations may be grouped in each texture block. This approach may also lead to efficient utilization of the texture cache. For example, as a first texture fetch operation is completing another texture fetch operation may begin. As a result, the latency of the second texture fetch operation may be hidden as the second texture fetch operation is performed "in the shadow" of the first texture fetch operation.

During execution of the segmented shader program, instruction scheduler 130 qualifies and prioritizes math and texture cache access operations in a current phase of the shader program until a boundary between the current phase and a subsequent phase is reached. Each instruction may include a phase ID, inserted by the compiler during segmentation. Instruction scheduler 130 continues to qualify and prioritize current instructions until a phase boundary is reached, at which point texture cache access operations in the subsequent phase are not qualified until all texture cache access operations in the current phase have completed. This allows the execution of texture operations in the subsequent phase after all texture cache access operations in the current phase have completed. In some embodiments of the present invention, math operations in the subsequent phase may be qualified (based on a qualification rule) before all of the texture cache access operations in the current phase have completed. Because math operations typically do not access the texture cache, they may be allowed to execute somewhat randomly, without having to wait for previous phase texture blocks to complete.

Returning to FIG. 5A, if, in step 502 prioritization module 136 determines that there are memory request instructions that are included in a segment, then in step 504 prioritization module 136 orders the memory request instructions based on the segment order. In step 506 prioritization module 136 prioritizes all instructions in instruction buffer 120 by instruction type as they pertain to pipeline resources. In some embodiments of the present invention, counts may be computed for the number of instructions that require each computation resource, each storage resource, and memory request type. The counts may be weighted to increase or to decrease the priority of the corresponding instruction type. For example, different types of memory requests may be weighted differently, giving some types of memory requests higher or lower priority relative to other types of memory requests. Instructions in the qualified set of instructions that match the type of memory request with the highest count may be prioritized for issue ahead of other instructions by prioritization module 136.

In step 507 prioritization module 136 orders the current instructions in the qualified set of instructions based on position to improve locality between the different threads. Improving locality may result in more efficient cache accesses since data for nearby positions may be loaded into the data cache when data for a first position is fetched. Therefore, cache thrashing may be reduced and the hit rate improved.

In step 508 prioritization module 136 orders the current instructions in the qualified set of instructions based on thread type. For example, vertex threads may have priority over pixel threads. In step 510 prioritization module 136 orders the current instructions in the qualified set of instructions by performing a search using one or more counts maintained for each thread, as described in conjunction with FIGS. 5B and 5C. Prioritization module 136 may perform the instruction search starting with the thread corresponding to a qualified instruction that is the oldest, based on the thread age attribute. Prioritization module 136 may order the instructions from oldest to youngest as it searches to produce the set of prioritized instructions. Prioritization module 136 may maintain a counter corresponding to the thread age, incrementing the counter as the instructions are ordered. Different counters may be used for different thread types.

In another embodiment of the present invention, prioritization module 136 may perform the search starting with the most recently issued thread, i.e., the thread corresponding to the most recently issued current instruction, to perform a round-robin prioritization. In still another embodiment of the present invention, another count, an issue-credit count maintained by prioritization module 136 for each thread, is used to prioritize the set of qualified instructions. Prioritization module 136 may order the instructions in order of decreasing issue priority as the issue-credit counts increase to produce the set of prioritized instructions. The method of computing the issue-credit counts is described in conjunction with FIG. 5B. Rules engine 138 may specify the prioritization rule used by prioritization module 136 in step 510.

Figure 5B:
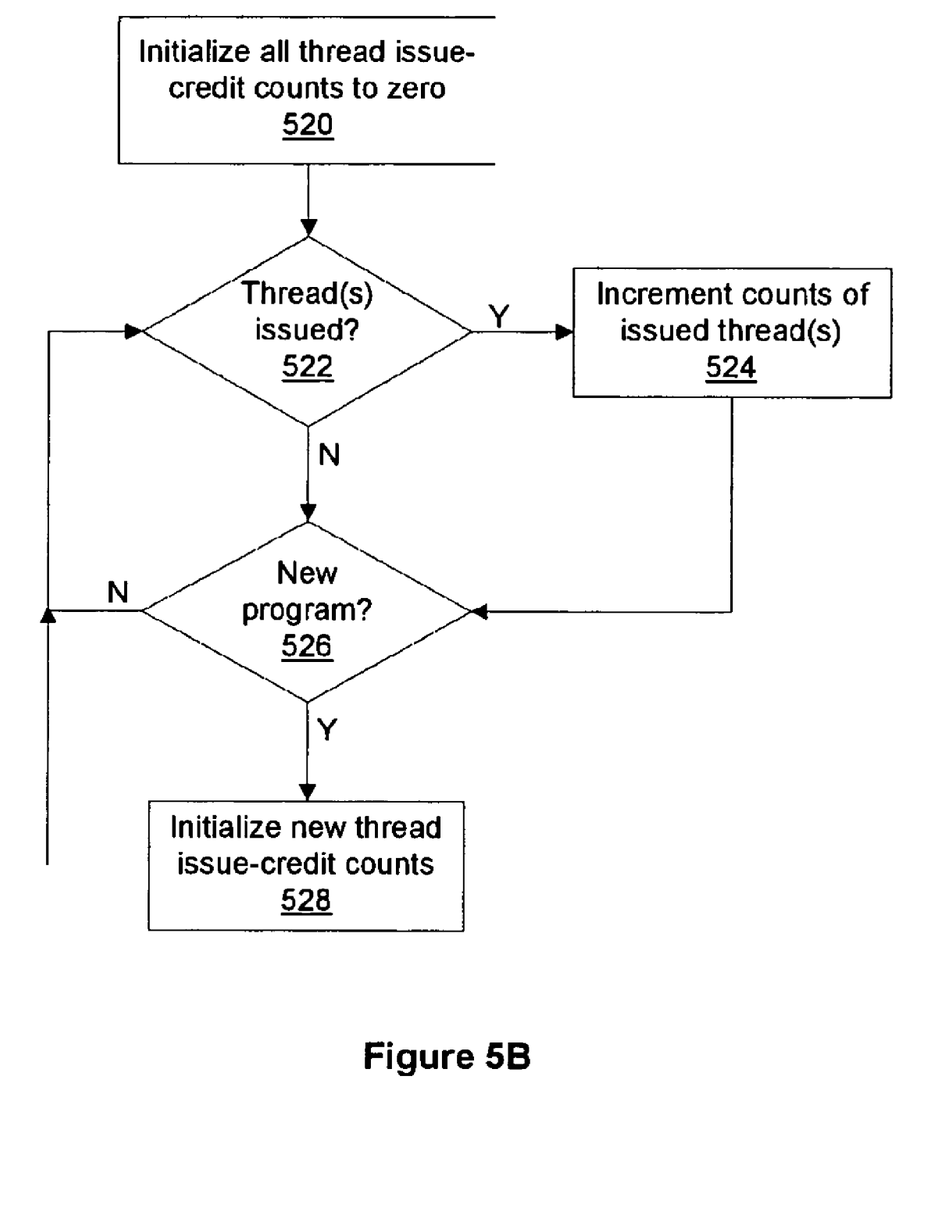
FIG. 5B is a flow chart of a method of computing issue-credit counts for use in step 402 of FIG. 4A in accordance with one embodiment of the present invention.

FIG. 5B is a flow chart of a method of computing issue-credit counts for use in step 402 of FIG. 4A, in accordance with one embodiment of the present invention. In step 520 all thread issue-credit counts are initialized to zero. An issue-credit count is maintained for each thread in buffer 120. Step 520 may be completed when buffer 120 is loaded with current instructions and the thread counts may be maintained by prioritization module 136. In step 522 prioritization module 136 determines if a current instruction for one or more threads have issued, and, if not, prioritization module 136 proceeds directly to step 526. Otherwise, in step 524, the issue-credit count for each of the issued threads is incremented, as described in conjunction with FIG. 5C. In some embodiments of the present invention, the issue-credit count may be incremented by more than one for particular instructions. For example, incrementing issue-credit counts for memory request instructions by more than one may improve memory access locality.

Threads with the lowest count may be given the highest issue priority. Therefore, threads that have executed farther through the program will continue executing if and only if threads that have fallen behind are all stalled. Although the threads execute asynchronously, more synchronous execution is encouraged using issue-credit counts. Furthermore, thread launch order, i.e., the order in which threads are allocated to execute a program, is preserved over longer time scales.

In step 526 prioritization module 136 determines if buffer 120 has been loaded with a new program, and, if not, prioritization module 136 returns to step 522 to update the issue-credit counts for the next issue cycle. Otherwise, in step 528 prioritization module 126 initializes the issue-credit counts of newly launched threads as a maximum issue-credit count of the existing threads increased by one, then goes directly to 522. The increase of one ensures that the existing threads have issue priority compared with the newly launched threads. If, during prioritization, prioritization module 136 determines that two or more qualified instructions have equal issue-credit counts, other attributes, such as thread age, may be used to order the two or more qualified instructions relative to each other. For example, ordering schemes described in conjunction with FIG. 5A may be used.

A benefit of using the issue-credit count to prioritize instructions is that memory access efficiency may be increased while maintaining computational efficiency since threads are likely to issue in launch order. For pixel threads, the threads are usually launched in raster order, therefore pixel locality is maintained by issuing pixel thread instructions in launch order. Another benefit is that the issue-credit count of stalled threads will increase, thereby increasing the priority of stalled threads such that prioritization module 136 will favor those threads when they are in the set of qualified threads, i.e., when the stalled threads are no longer stalled. Therefore, threads that have fallen behind may catch up as their priority increases based on their decreasing (relative to the issue-credit counts of other threads) issue-credit counts. Threads may stall due to resource conflicts, memory latency, resource limitations, or the like. Execution unit status monitor 155 provides instruction scheduler 130 with information on threads that are stalled.

Overflow of an issue-credit counter may be handled in a variety of ways. In one embodiment of the present invention, the issue-credit counter may saturate, when a maximum value that can be represented by the counter is reached, limiting the range over which thread separation may be reduced. When an issue-credit counter overflows an overflow bit is set corresponding to that issue-credit counter. Saturation allows the issue-credit counts to continue to be used for prioritization, since threads with saturated issue-credit counters, i.e., set overflow bits, may be given lowest issue priority. All of the overflow bits are reset to zero once all of the issue-credit counters have overflowed in order to maintain separation information between the threads.

Figure 5C:
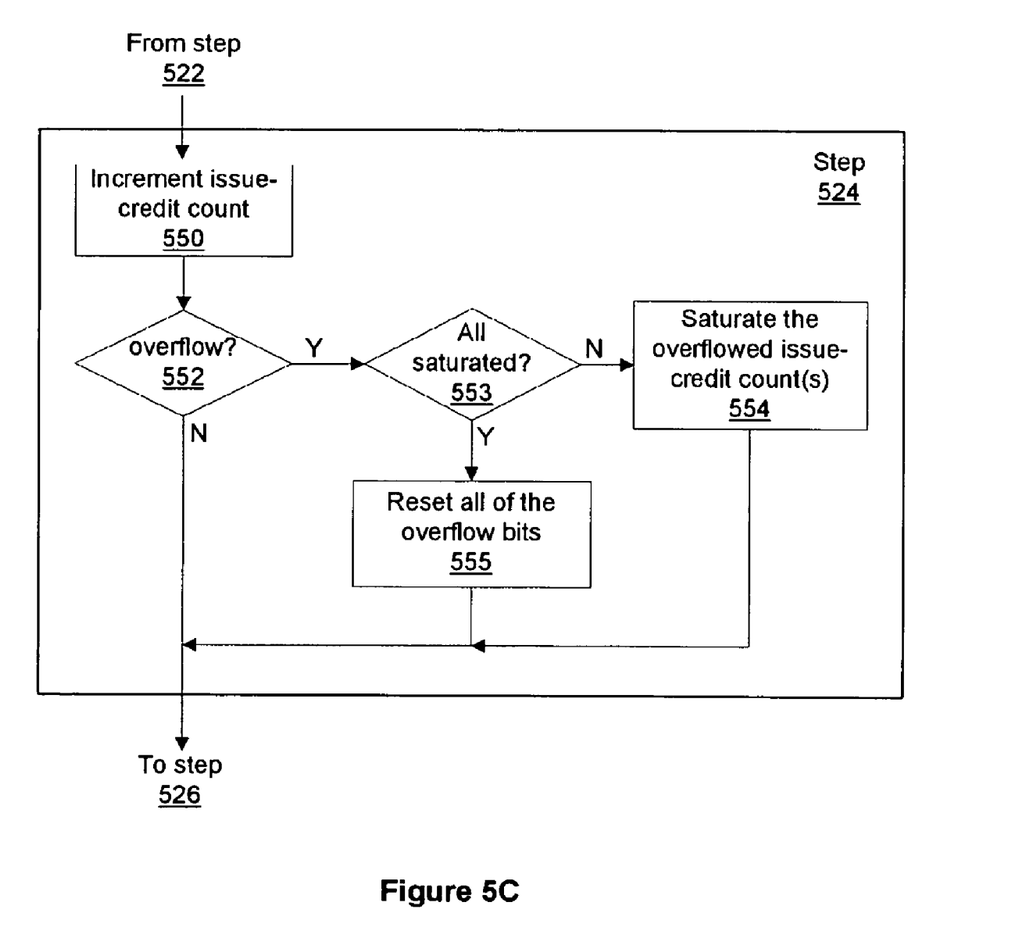
FIG. 5C is a flow charts of method of performing step 524 of FIG. 5B in accordance with one embodiment of the present invention; and Like reference numerals refer to corresponding parts throughout the several views of the drawings.

FIG. 5C is a flow chart of another method of performing step 524 of FIG. 5B, in accordance with one embodiment of the present invention. In step 550 prioritization module 136 increments the issue-credit counter of the issued thread(s). In step 552 prioritization module 136 determines if any incremented issue-credit counter is overflowed, and, if so, in step 553 prioritization module 136 determines if all of the issue-credit counters have overflowed. If, in step 553 prioritization module 136 determines that all of the issue-credit counters have not overflowed, then in step 554 any overflowed issue-credit counter(s) incremented in step 550 are saturated and the corresponding overflow bit(s) are set. If, in step 553 prioritization module 136 determines that all of the issue-credit counters have overflowed, then in step 555 prioritization module 136 reset all of the issue-credit counter overflow bits.

If, in step 552 prioritization module 136 determines that the incremented issue-credit counter did not overflow, then prioritization module 136 proceeds directly to step 526. In other embodiments of the present invention, some threads or a thread type may be designated as low priority and may be incremented by more than one for each issued instruction. Persons skilled in the art will appreciate that any system configured to perform the method steps of FIG. 2, 4A, 4B, 4C, 5A, 5B, or 5C, or their equivalents, is within the scope of the present invention.

The current invention involves new systems and methods for qualifying buffered current instructions to produce a set of qualified instructions based on qualification rules and prioritizing said qualified instructions to produce prioritized instructions based on prioritization rules to improve utilization of said different types of execution units. One or more of the prioritized instructions are then issued to execution units for execution.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A multi-threaded processor, comprising:
    a plurality of different types of execution units, at least one of each type of execution unit servicing a different class of operations;
    an instruction buffer buffering a set of current instructions for a plurality of asynchronous threads, each current instruction requiring an operation performed by one of each of said plurality of different types of execution units;
    a compiler dividing the set of current instructions into phases of executable instructions, each phase having one or more math operations and one or more texture cache access operations; and
    an instruction scheduler, said instruction scheduler comprising a qualification module configured to qualify said one or more math operations and said one or more texture cache access operations in a current phase for execution based on a qualification rule to produce a set of qualified instructions and a prioritization module configured to prioritize said set of qualified instructions based on a prioritization rule to produce prioritized instructions for issue from said instruction buffer to said plurality of different types of execution units, wherein said instruction scheduler continues to qualify said one or more math operations and said one or more texture cache access operations in said current phase until a boundary between said current phase and a subsequent phase is reached, at which point, no texture cache access operation in said subsequent phase is qualified until all of said one or more texture cache access operations in said current phase have completed.

2. The multi-threaded processor of claim 1, wherein said prioritization rule specifies that said prioritized instructions is produced based on issue-credit counters maintained by said prioritization module for said plurality of asynchronous threads.

3. The multi-threaded processor of claim 2, wherein a portion of said issue-credit counters are incremented each issue cycle when a prioritized instruction is issued from said instruction buffer to reduce an issue priority of asynchronous threads corresponding to said portion of issue-credit counters.

4. The multi-threaded processor of claim 3, wherein said issue-credit counters are incremented by a value of one and said issue-credit counters saturate when a maximum value is reached.

5. The multi-threaded processor of claim 3, wherein overflow bits corresponding said issue-credit counters are reset when all said issue-credit counters are saturated.

6. The multi-threaded processor of claim 1, wherein said prioritization rule specifies that said prioritized instructions are produced based on memory requests.

7. The multi-threaded processor of claim 6, wherein said memory requests are grouped into blocks including texture fetches and math operations.

8. The multi-threaded processor of claim 1, wherein said prioritization rule specifies that said prioritized instructions are produced based on position to maintain locality.

9. The multi-threaded processor of claim 1, wherein said qualification rule specifies that said set of qualified instructions is produced by excluding said current instructions based on a synchronization state, an in-flight instruction waiting for a hit in a data cache, an instruction serialization requirement, and a maximum instruction issue frequency.

10. The multi-threaded processor of claim 1, wherein said qualification rule specifies that said set of qualified instructions is produced by excluding said current instructions based on a storage resource limit, a resource sharing limit, and a branch instruction limit.

11. The multi-threaded processor of claim 1, wherein said asynchronous threads include at least one of pixel threads, vertex threads, and primitive threads.

12. The multi-threaded processor of claim 1, further comprising a programmable rules engine configured to provide said qualification rule to said qualification module and to provide said prioritization rule to said prioritization module.

13. A method of operating a multi-threaded processor, comprising:
    buffering current instructions for asynchronous threads, a current instruction of an individual thread requiring one of a plurality of different types of execution units to service a class of operations;
    dividing the current instructions into phases of executable instructions, each phase having one or more math operations and one or more texture cache access operations;
    qualifying buffered one or more math operations and one or more texture cache access operations in a current phase based on a qualification rule to produce a set of qualified instructions, wherein buffered one or more math operations and one or more texture cache access operations in said current phase are qualified until a boundary between said current phase and a subsequent phase is reached, at which point, no texture cache access operation in said subsequent phase is qualified until all of said one or more texture cache access operations in said current phase have completed;

prioritizing said qualified instructions to produce prioritized instructions based on a prioritization rule to improve utilization of said different types of execution units; and for each issue cycle, issuing at least a portion of said prioritized instructions to said plurality of execution units for execution to produce issued instructions.

14. The method of claim 13, wherein said prioritization rule specifies that said prioritized instructions are produced based on issue-credit counters maintained for said asynchronous threads.

15. The method of claim 14, further comprising updating said issue-credit counters corresponding to said issued instructions to modify an issue priority of said asynchronous threads corresponding to said issued instructions.

16. The method of claim 14, further comprising resetting overflow bits corresponding to said issue cycle counters when all of said issue cycle counters are saturated.

17. The method of claim 13, wherein said prioritization rule specifies that said prioritized instructions are produced based on position to maintain locality.

18. The method of claim 13, wherein said prioritization rule specifies that said prioritized instructions are produced based on memory requests.

19. The method of claim 13, wherein said qualification rule specifies that said set of qualified instructions is produced by excluding said current instructions based on a synchronization state, an in-flight instruction waiting for a hit in a data cache, an instruction serialization requirement, and a maximum instruction issue frequency.

20. The method of claim 13, wherein said qualification rule specifies that said set of qualified instructions is produced by excluding said current instructions based on a storage resource limit, a resource sharing limit, and a branch instruction limit.

* * * * *